(12) United States Patent
Oue et al.

(10) Patent No.: US 9,948,053 B2
(45) Date of Patent: Apr. 17, 2018

(54) DIFFRACTION GRATING FOR LASER PULSE COMPRESSION AND LASER DEVICE

(71) Applicant: SHIMADZU CORPORATION, Kyoto-shi, Kyoto (JP)

(72) Inventors: Yuki Oue, Kyoto (JP); Yoshitaka Makino, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 173 days.

(21) Appl. No.: 14/759,111

(22) PCT Filed: Jan. 31, 2013

(86) PCT No.: PCT/JP2013/052145
§ 371 (c)(1),
(2) Date: Jul. 2, 2015

(87) PCT Pub. No.: WO2014/118925
PCT Pub. Date: Aug. 7, 2014

(65) Prior Publication Data
US 2015/0349479 A1    Dec. 3, 2015

(51) Int. Cl.
*H01S 3/00* (2006.01)
*G02B 5/18* (2006.01)
*H01S 3/23* (2006.01)

(52) U.S. Cl.
CPC .......... *H01S 3/0057* (2013.01); *G02B 5/1809* (2013.01); *G02B 5/1861* (2013.01); *H01S 3/2308* (2013.01)

(58) Field of Classification Search
CPC ............................. H01S 3/0057; H01S 3/2308
See application file for complete search history.

(56) References Cited

U.S. PATENT DOCUMENTS 3,943,457 A * 3/1976 Lehmberg ............ H01S 3/0057
                                                      356/520
2001/0024275 A1* 9/2001 Suzuki .................. G01J 3/1809
                                                      356/328

(Continued)

FOREIGN PATENT DOCUMENTS

FR           2942549 A1    8/2010
JP           9-211504 A    8/1997

(Continued)

OTHER PUBLICATIONS

Treacy, "Compression of Picosecond Light Pulses," Physics Letters A, vol. 28, No. 1, pp. 34-35.*

(Continued)

*Primary Examiner* — Michael Carter
(74) *Attorney, Agent, or Firm* — Sughrue Mion, PLLC

(57) ABSTRACT

A pulse compressor for compressing a laser pulse in a laser device using a chirped pulse amplification method includes two identically shaped diffraction gratings arranged parallel to each other with their respective grating surfaces facing each other and a total reflection mirror for receiving a laser pulse through the diffraction grating and returning it back to the same gratings. Each diffraction grating is a reflective blazed diffraction grating having grooves with a sawtooth-shaped section covered with a reflective Au coating on their surface, with the blaze angle determined so that, at the wavelength of the laser pulse to be used, the incident angle of a laser pulse entering the pulse compressor and first order diffracted light form a relationship of mirror reflection with the groove slope and so that a predetermined level of diffraction efficiency is obtained. Since the laser pulse impinges on the grating at substantially right angles to the groove slope, a high level of damage threshold is obtained and a high-power laser pulse can be generated.

9 Claims, 3 Drawing Sheets

(56) References Cited

U.S. PATENT DOCUMENTS

| | | | |
|---|---|---|---|
| 2004/0021946 A1 | 2/2004 | Hoose et al. | |
| 2004/0125374 A1* | 7/2004 | Berger | G01J 3/18 356/364 |
| 2005/0130072 A1* | 6/2005 | Koeda | G02B 5/1857 430/321 |
| 2010/0149641 A1* | 6/2010 | Greenberg | G02B 17/0856 359/566 |
| 2013/0223460 A1* | 8/2013 | Cheriaux | H01S 3/0057 372/25 |

FOREIGN PATENT DOCUMENTS

| | | | |
|---|---|---|---|
| JP | 2005-157118 A | 6/2005 |
| JP | 2007-109962 A | 4/2007 |
| JP | 2008-233528 A | 10/2008 |
| JP | 2009031615 A | 2/2009 |
| JP | 2009-121986 A | 6/2009 |
| WO | 2004/081620 A1 | 9/2004 |

OTHER PUBLICATIONS

Communication dated Jan. 5, 2016 from the European Patent Office in counterpart application No. 13873965.1.

Shore et al. "Design of high-efficiency dielectric reflection gratings," Journal of the Optical Society of America, vol. 14, No. 5, May 1997. pp. 1124-1136.

International Written Opinion of PCT/JP2013/052145, dated Aug. 20, 2013. [PCT/ISA/237].

Bruno Touzet, "New Multilayer Dielectric Gratings will Double the Output Power of High Energy Laser", JY Division Information, HORIBA Technical Reports, HORIBA, Ltd., [online], [accessed on Jan. 18, 2013],English Edition No. 7; the Internet <URL: http://www.horiba.com/uploads/media/R027-04-018_01.pdf.

International Search Report of PCT/JP2013/052145, dated Aug. 20, 2013. [PCT/ISA/210].

* cited by examiner

DIFFRACTION GRATING FOR LASER PULSE COMPRESSION AND LASER DEVICE

CROSS REFERENCE TO RELATED APPLICATIONS

This application is a National Stage of International Application No. PCT/JP2013/052145 filed Jan. 31, 2013, the contents of all of which are incorporated herein by reference in their entirety.

TECHNICAL FIELD

The present invention relates to a diffraction grating for laser pulse compression used in a pulse compressor for compressing the pulse width of a laser pulse as well as a laser device in which this diffraction grating is used in a pulse compressor.

BACKGROUND ART

As a laser device for generating the so-called femtosecond laser which is high-powered (high-energy) laser light having a pulse width on the order of femtoseconds to picoseconds, a laser device using a chirped pulse amplification (CPA) method is commonly known (for example, see Patent Literature 1). In a laser device using the CPA method, the duration (pulse width) of the laser light generated by a laser oscillator is increased by a laser stretcher to reduce its peak intensity, after which its power is amplified by a laser amplifier to such an extent that the laser medium will not be damaged. Subsequently, the laser pulse is sent into a pulse compressor which works opposite to the pulse stretcher and temporally compresses the pulse to produce an output pulse whose peak intensity is increased by an amount corresponding to the amount of compression.

The laser pulse generated by a laser oscillator has an extremely small yet certain amount of wavelength width. The pulse stretching and pulse compression makes use of this wavelength width (margin) to stretch and compress the pulse width (duration) of the laser light. For example, the pulse stretching is achieved by spatially dispersing the light into different wavelength components and making them respectively travel different optical path lengths. The pulse compression is achieved by the opposite principle. In general, a grating pair consisting of a pair of diffraction gratings having the same structure is used in such a pulse stretcher or pulse compressor.

Patent Literature 2 discloses a typical pulse compressor (double-path configuration) employing a grating pair. That is to say, this pulse compressor includes two diffraction gratings arranged parallel to each other with their respective grating surfaces facing each other (i.e. the grating pair) and a mirror for receiving a laser pulse which has passed through the grating pair and for totally reflecting the pulse back to the same grating pair. A laser pulse amplified by a laser amplifier is introduced into this pulse compressor and travels through the grating pair. After being reflected by the mirror, the laser pulse once more travels through the grating pair back to the original point (i.e. the pulse travels a complete cycle). During this process, its wavelength width is reduced, whereby its peak intensity is increased. Such a configuration of the pulse compressor is characterized in that the two gratings can be placed at a comparatively small distance from each other. This is advantageous for reducing the device size.

As just described, in a laser device employing the CPA method, a high-energy laser pulse amplified by a laser amplifier hits the diffraction gratings which constitute the pulse compressor. Therefore, the damage to the grating surfaces (i.e. reflecting surfaces) of the diffraction gratings will be a problem. This means that the damage threshold (i.e. energy tolerance) of the diffraction gratings used in the pulse compressor imposes a considerable restriction in realizing a high-power laser device using the CPA method. To improve the damage threshold of the diffraction gratings used in the pulse compressor, various methods have been proposed, such as increasing the thickness of the reflection coating on the surface of the diffraction grating or using a multilayer dielectric film having a high level of energy tolerance as the reflection coating (see Patent Literature 3 and Non Patent Literature 1). Those methods are certainly effective for improving the damage threshold. However, those techniques increase the production cost of the diffraction gratings and make the laser device more expensive.

CITATION LIST

Patent Literature

Patent Literature 1: US 2011/0026105 A
Patent Literature 2: JP 9-211504 A
Patent Literature 3: US 2012/0093191 A

Non Patent Literature

Non Patent Literature 1: Bruno Touzet, "Choukou-Energii Parusu-Reeza No Shutsuryoku Wo Baizou Saseru Tasoumaku Yuudentai Gureetingu (Multilayer Film Dielectric Grating for Doubling the Power of Ultra-High Energy Pulse Laser) - HORIBA Technical Reports", HORIBA, Ltd., [online], [accessed on Jan. 18, 2013], the Internet

SUMMARY OF INVENTION

Technical Problem

The present invention has been developed to solve the previously described problem. Its objective is to provide a diffraction grating for laser pulse compression which is inexpensive yet capable of ensuring a high level of damage threshold, as well as a laser device using such a diffraction grating.

Solution to Problem

The present invention aimed at solving the previously described problem is a diffraction grating to be used in a pulse compressor including two identically shaped diffraction gratings arranged parallel to each other with their respective grating surfaces facing each other in a laser device using a chirped pulse amplification method, wherein:

the diffraction grating is a reflective blazed diffraction grating having grooves with a sawtooth-shaped section covered with a reflective metallic coating at least on their surface, the diffraction grating having a blaze angle determined so that, at the wavelength of a laser pulse to be used, the incident angle of an incoming laser pulse and first order diffracted light form a relationship of mirror reflection with the groove slope, and a predetermined level of diffraction efficiency is obtained.

The first mode of the laser device according to the present invention aimed at solving the previously described problem is a laser device using a chirped pulse amplification method, the laser device using the diffraction grating according to the present invention as a diffraction grating in a pulse compressor, wherein:

the pulse compressor includes two identically shaped diffraction gratings provided as first and second diffraction gratings arranged parallel to each other with their respective grating surfaces facing each other and a mirror for receiving a laser pulse via the first and second diffraction gratings and for reflecting the laser pulse so that the laser pulse sequentially impinges on the second and first diffraction gratings, the two diffraction gratings arranged so that the laser pulse travelling from the second diffraction grating to the first diffraction grating impinges on the first diffraction grating at substantially right angles to the groove slope of the first diffraction grating.

In other words, the optical system of the pulse compressor in the first mode of the laser device has a double-path configuration.

The second mode of the laser device according to the present invention aimed at solving the previously described problem is a laser device using a chirped pulse amplification method, the laser device using the diffraction grating according to the present invention as a diffraction grating in a pulse compressor, wherein:

the pulse compressor is configured to extract a laser pulse via two identically shaped diffraction gratings provided as first and second diffraction gratings arranged parallel to each other with their respective grating surfaces facing each other, the two diffraction gratings arranged so that the laser pulse travelling from the first diffraction grating to the second diffraction grating impinges on the second diffraction grating at substantially right angles to the groove slope of the second diffraction grating.

In other words, the optical system of the pulse compressor in the second mode of the laser device has a single-path configuration.

In a reflective blazed diffraction grating having a grating surface with a sawtooth-shaped section, electromagnetic waves produced by a laser pulse are likely to be concentrated on the pointed ridge portion of the grating and damage the reflection coating at that portion. Taking this into account, in the diffraction grating according to the present invention, the blaze angle is determined so that a predetermined level of diffraction efficiency will be obtained at the wavelength of the laser pulse to be used, under the condition that the incident angle of an incoming laser pulse and first order diffracted light form the relationship of mirror reflection with the groove slope. Therefore, for example, when a pair of such diffraction gratings are used in a pulse compressor, it is possible to make a laser pulse impinge on each grating at substantially right angles to the groove slope.

Making the laser pulse impinge on the blazed diffraction grating at substantially right angles to the groove slope lowers the degree of concentration of the electromagnetic waves on the pointed ridge portion of the grating. Therefore, for example, as compared to the case where the laser pulse impinges on the grating in the direction normal to the grating surface, the reflection coating is less likely to be damaged. In other words, the damage threshold of the diffraction grating is improved. Therefore, a laser device using this diffraction grating in the pulse compressor allows the use of a higher amount of laser power. Furthermore, since the diffraction grating has a sufficiently high diffraction efficiency, only a low loss of energy of the laser pulse occurs in the pulse compressor. This is also advantageous for increasing the level of laser power. The diffraction grating according to the present invention does not require making the reflection coating unnecessarily thick to increase the damage threshold. Furthermore, it does not use a multilayer dielectric film whose production process is complex. Accordingly, the grating can be produced at a low cost.

The diffraction grating for laser pulse compression according to the present invention may preferably be a replicated diffraction grating having a grating surface created by forming a metallic reflection coating on the surface of the grating grooves of a master diffraction grating having grooves with a predetermined sawtooth-shaped section, making the metallic reflection coating in tight contact with a replica substrate via a resin material in between, and releasing the replica substrate from the master diffraction grating, with the metallic reflection coating in an inverted form adhered to the replica substrate.

By this process, diffraction gratings with stable performance can be obtained at a low cost.

Advantageous Effects of the Invention

With the diffraction grating for laser pulse compression according to the present invention, it is possible to ensure a high level of damage threshold and achieve a high diffraction efficiency for the required wavelength without using a special structure, such as a multilayer dielectric film. Therefore, by using the diffraction grating according to the present invention as a pulse compressor in a laser device using the CPA method, a high level of power can be realized while reducing the device cost.

In the first and second modes of the laser device according to the present invention, the previously described diffraction grating for laser pulse compression according to the present invention is used as the diffraction grating which receives the highest amount of light energy on its grating surface (reflecting surface) in the pulse compressor, and the laser pulse impinges on this grating surface of the diffraction grating at substantially right angles, so that the grating surface is highly durable and less likely to undergo damage. Therefore, for example, it is possible to increase the degree of amplification in a laser amplifier or to reduce the spatial spread of the beam produced by the diffraction grating, so as to increase the intensity of the laser pulse to be eventually extracted from the pulse compressor.

DESCRIPTION OF EMBODIMENTS

Figure 1:
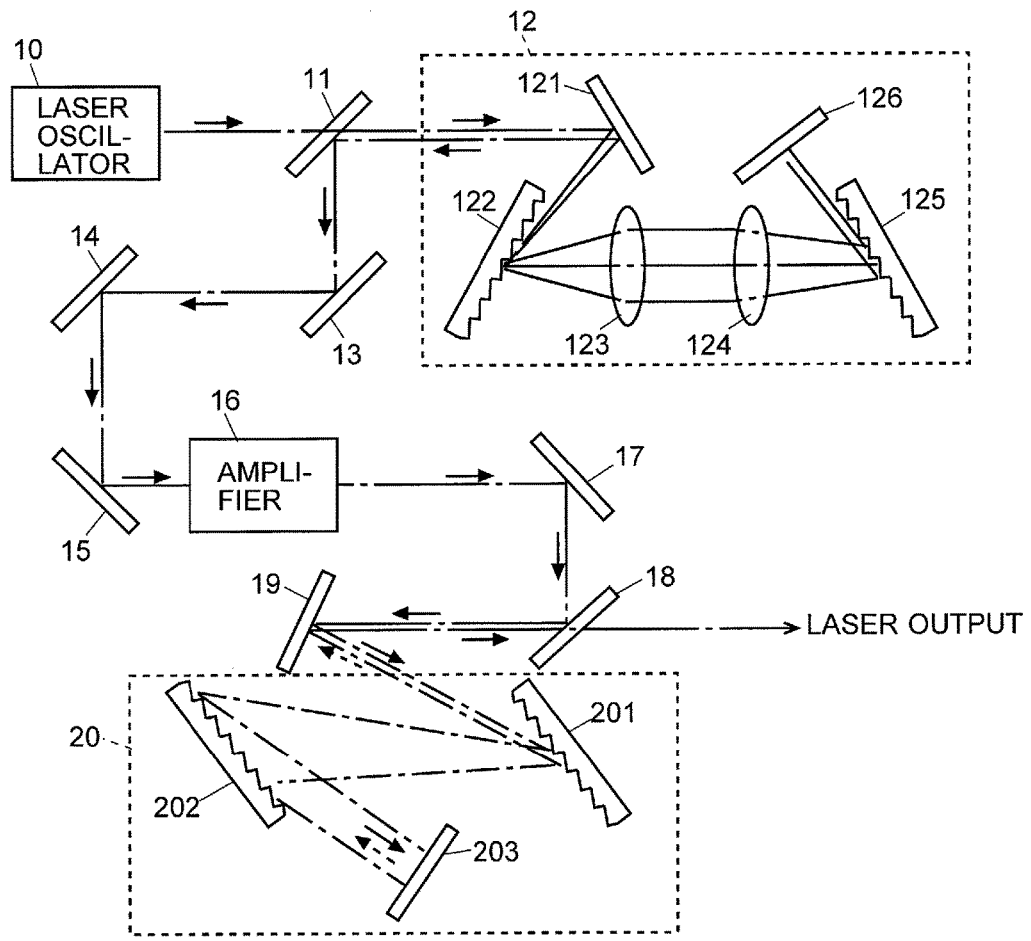
FIG. 1 is an overall configuration diagram of one embodiment of the laser device according to the present invention.

A diffraction grating according to one embodiment of the present invention as well as a laser device using this grating is hereinafter described with reference to the attached drawings. FIG. 1 is an overall configuration diagram of the laser device of the present embodiment.

In the laser device of the present embodiment, a laser oscillator 10 produces a laser pulse having an extremely short duration around a predetermined wavelength. This pulse is introduced via a half mirror 11 into a pulse stretcher 12. The pulse stretcher 12 returns the same laser pulse after increasing its pulse width to the half mirror 11. This laser pulse is the chirped pulse, whose peak intensity (power) is decreased by an amount corresponding to the increase in the pulse width. The chirped pulse is reflected by the half mirror 11 as well as the mirrors 13, 14 and 15, and introduced into a laser amplifier 16. In the laser amplifier 16, the pulse is amplified to obtain a pulse having an increased peak intensity while maintaining approximately the same pulse width. The amplified chirped pulse is introduced via a mirror 17, half mirror 18 and mirror 19 into a pulse compressor 20. The pulse compressor 20 works opposite to the pulse stretcher 12 and produces a pulse having a decreased pulse width and a correspondingly increased peak intensity. The obtained pulse is returned to the mirror 19. This narrow laser pulse with the high peak intensity is sent through the half mirror 18 to the outside.

As shown in FIG. 1, the pulse stretcher 12 includes a pair of diffraction gratings 122 and 125 facing each other with their upper ends tilted inward, afocal lenses 123 and 124 located between the two diffraction gratings 122 and 125, as well as a mirror 126 for reflecting light reflected by the diffraction grating 125. The laser light generated by the laser oscillator 10 has a slight wavelength width. The diffraction gratings 122 and 125 spatially expands this wavelength width. When the spatially dispersed light travels from the second diffraction grating 125 to the mirror 126 and returns to the same grating after being reflected by the mirror 126, each wavelength of the light travels an optical path whose length varies depending on the wavelength. Specifically, a component of light having a shorter wavelength travels a longer optical path and becomes stretched toward the trailing edge of the laser pulse. Conversely, a component of light having a longer wavelength travels a shorter optical path and becomes stretched toward the leading edge of the laser pulse. Therefore, the laser pulse which has returned to the light-entry end of the pulse stretcher 12 has a greater pulse width than when it entered.

On the other hand, the pulse compressor 20 includes a pair of diffraction gratings 201 and 202 arranged parallel to each other with their respective grating surfaces facing each other, and a mirror 203 for totally reflecting light reflected (diffracted) by the second diffraction grating 202. Since the angular dispersion by the first diffraction grating 201 is cancelled by the second diffraction grating 202, a parallel beam impinging on the first diffraction grating 201 with different wavelength components restores its parallel form when it leaves the second diffraction grating 202 for the mirror 203. However, those components of light having different wavelengths travel different optical path lengths; as opposed to the case of the pulse stretcher 12, a component of light having a shorter wavelength travels a shorter optical path, while a component of light having a longer wavelength travels a longer optical path. As a result, this time, the pulse which has been stretched in the forward and backward directions is temporally compressed. The laser pulse which has been introduced from the mirror 19 into the pulse compressor 20 is reflected by the mirror 203 and returns to the point of incidence through the same path as the first half. That is to say, in the pulse compressor 20, any wavelength component of the laser pulse travels a complete cycle.

As just described, both the pulse stretcher 12 and the pulse compressor 20 use diffraction gratings, among which the diffraction gratings 201 and 202 used in the pulse compressor 20 are hit by a particularly high power of laser light and likely to undergo damage to their reflection coating, since the laser pulse introduced into the pulse compressor 20 is a chirped pulse with an amplified power, and furthermore, since the laser intensity is further increased through the pulse compression process. Accordingly, the two diffraction gratings 201 and 202 used in the pulse compressor 20 need to have a particularly high level of damage threshold. Additionally, in order to obtain high power, the loss of energy at the diffraction gratings 201 and 202 needs to be as low as possible, which means that a high diffraction efficiency needs to be obtained. To satisfy these requirements, in the present system, a characteristic arrangement and configuration as will be hereinafter described is adopted so as to realize both the high damage threshold and the high diffraction efficiency.

Figure 2:
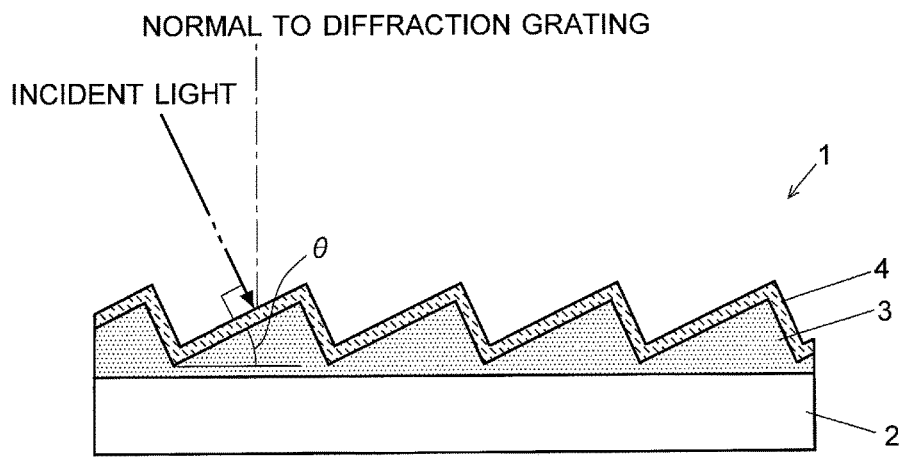
FIG. 2 is a schematic sectional view of one embodiment of the diffraction grating for laser pulse compression according to the present invention.

FIG. 2 is a schematic sectional view of one embodiment of the diffraction grating for laser pulse compression according to the present invention. This diffraction grating 1 is a reflective blazed diffraction grating having grooves with a sawtooth-shaped section. It is not the master grating but a replicated grating. That is to say, as shown in FIG. 2, it has a plate-shaped replica substrate 2 on which a resin layer 3 having grating grooves with a sawtooth-shaped section is formed, with the surface of the grating grooves coated with an Au layer 4 as the metallic reflection coating. Such a replicated diffraction grating can be produced by a previously known process, e.g. by a method described in JP 4973367 B.

Specifically, in the present example, an Au film (having a thickness of 250 nm, with Cr used as the binder layer) is formed on a master diffraction grating having a predetermined form of grating on its surface. Subsequently, a resin material is applied on the Au layer, and a replica substrate (Zerodur®, manufactured by SCHOTT AG, Germany) is pressed on the resin layer. After the resin material is cured, the master diffraction grating is released with the aid of the detachability of Au, to obtain a replicated diffraction grating as shown in FIG. 2.

Figure 5:
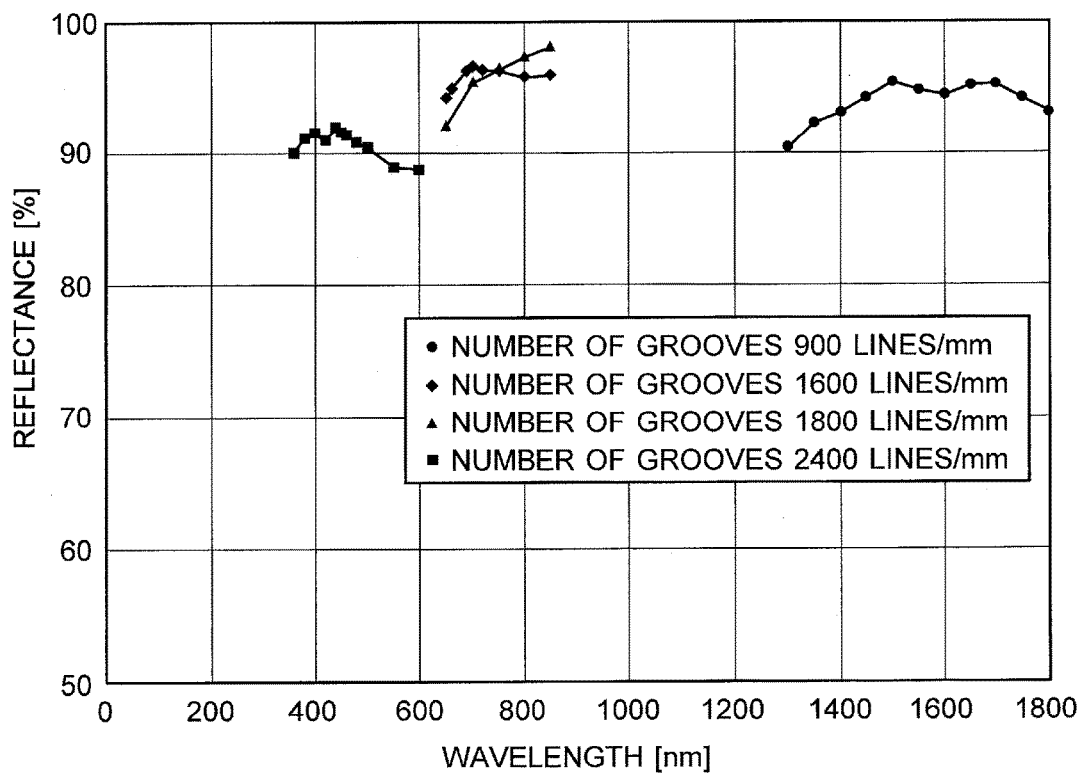
FIG. 5 is a chart showing the wavelength dependency of the reflectance of the diffraction grating of the present embodiment.

The slope angle of the grooves of the master diffraction grating (blaze angle), and hence the blaze angle of the replica diffraction grating is designed so that the diffraction efficiency within a range around the used laser wavelength (1,064 nm) will be maximized under the condition that the incident light and the first order diffracted light form the relationship of mirror reflection with the groove slope of the grating surface, i.e. the Littrow configuration. The number of grooves is 900 lines/mm. FIG. 5 shows a calculated result of the design diffraction efficiency for diffraction gratings with different numbers of grooves. Specifically, the shown diffraction efficiency is the relative diffraction efficiency for S-polarized light. As shown in FIG. 5, the diffraction efficiency within a range around the target wavelength almost constantly exceeds 90% and can be considered to be sufficiently high.

The damage threshold of the diffraction grating 1 shown in FIG. 2 against a laser pulse depends on the incident angle of the laser pulse. To verify this fact, an experiment has been conducted to evaluate the damage threshold for a pulsed beam of Nd:YAG laser of 1,064 nm which perpendicularly impinges on the diffraction grating (in the direction normal to the grating in FIG. 2) and for the same pulsed beam which impinges on the diffraction grating in a direction substantially orthogonal to the groove slope (the latter arrangement is hereinafter called the "Littrow configuration incidence"). The damage threshold was evaluated by the "1-on-1" method, in which the operation of irradiating one location on the diffraction grating with a single laser pulse is repeated while changing the location and energy of the irradiation until the grating becomes damaged. The width of the laser pulse was 10 ns, and the diameter of the irradiating laser beam on the grating surface was 1.1 mm. Actually, the arrangement used in this evaluating experiment was not exactly the Littrow configuration incidence; the incident angle was slightly shifted from the angle for the Littrow configuration incidence, since the light returned from the diffraction grating can damage the laser light source if the light directly enters the light source.

Figure 3:
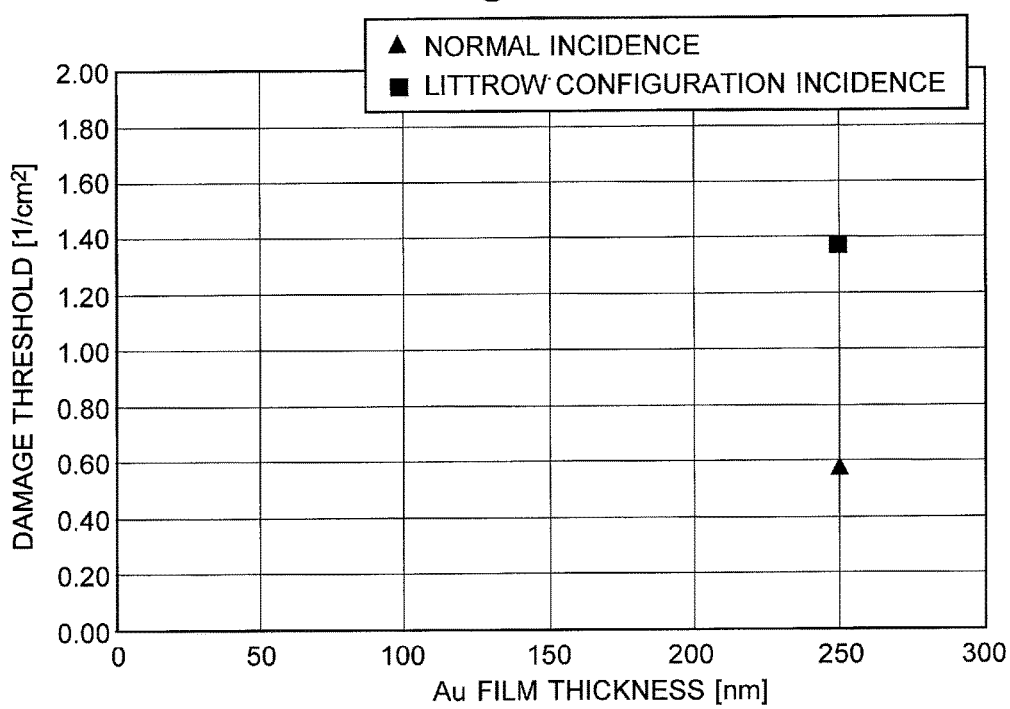
FIG. 3 is a chart showing a measured result of the damage threshold of the diffraction grating of the present embodiment.

FIG. 3 shows the result of this experiment. It can be seen that the damage threshold for the Littrow configuration incidence is 1.38 J/cm$^2$ and higher than two times the damage threshold for the normal incidence, which is 0.59 J/cm$^2$. In general, electromagnetic waves are known to concentrate on a pointed portion of an object. Therefore, when laser light impinges on a blazed diffraction grating, the electromagnetic waves produced by the laser light are most likely to concentrate on the tip of the pointed ridge portion of the sawtooth shape. Consequently, a strong electric field will be formed at the tip of the ridge portion, causing damage to the reflection coating by heat or other factors. It is likely that the degree of concentration of the electric field increases with a decrease in the sectional area of the reflection coating in a plane orthogonal to the incident laser light. Accordingly, the lowest degree of concentration of the electric field will be achieved when the laser light impinges on the grating at substantially right angles to the groove slope. Thus, the Littrow configuration incidence is probably the best configuration for improving the damage threshold.

Figure 4:
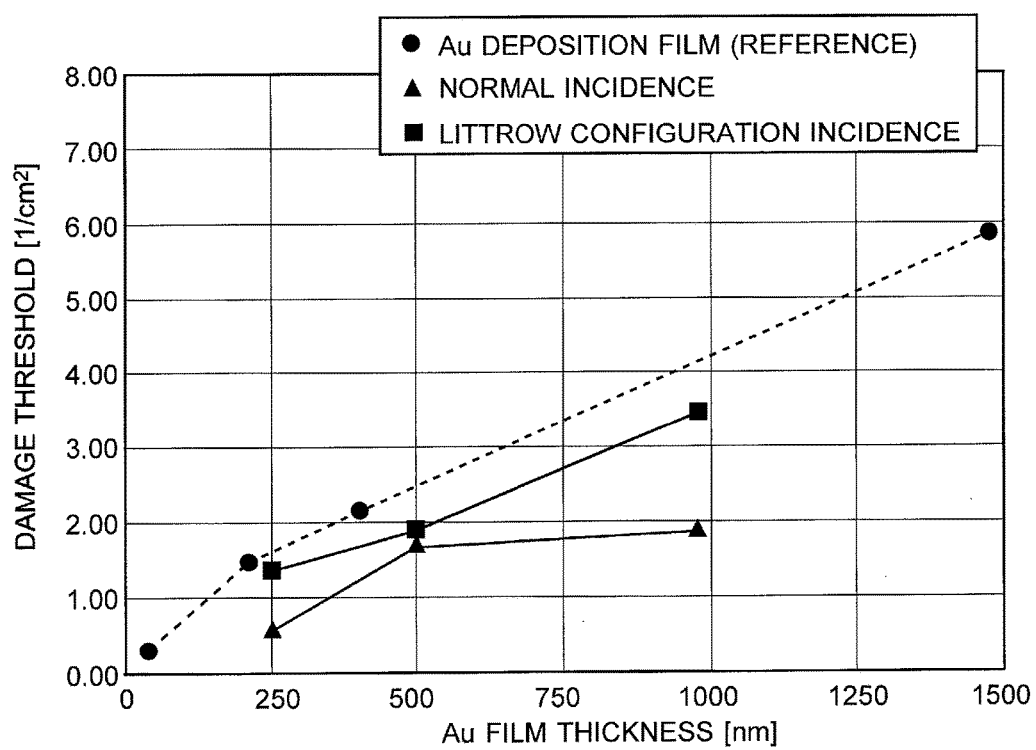
FIG. 4 is a chart showing a measured result of the damage threshold for various thicknesses of an Au film in the diffraction grating of the present embodiment.

The damage threshold for various thicknesses of the Au film has also been investigated by a similar method in order to confirm the effect of increasing the Au film thickness. FIG. 4 shows the result of the measurement. FIG. 4 also shows the result of a similar analysis on the damage threshold which was not performed for the diffraction grating but for a total reflection mirror with an Au film formed on the reflection surface. Under ideal conditions, the previously described concentration of the electric field does not occur on the total reflection mirror. Therefore, it is possible to consider that the damage threshold for the total reflection mirror indicates the highest possible value (or ideal value) of the damage threshold that can be achieved by diffraction gratings. As shown in FIG. 4, increasing the Au film thickness assuredly improves the damage threshold for the Littrow configuration incidence. In particular, it should be noted that the damage threshold achieved by a film thickness of 250 nm in the Littrow configuration incidence is almost equal to that achieved by a film thickness of approximately 400 nm in the normal incidence. Furthermore, the damage threshold achieved by the Littrow configuration incidence is considerably close to that achieved by the total reflection mirror. This fact demonstrates that the Littrow configuration shows a considerable level of performance in terms of the damage threshold.

As described previously, the diffraction grating of the present embodiment is designed so that the diffraction efficiency within a range around the used laser wavelength (1,064 nm) will be maximized under the condition that the incident light and the first order diffracted light form the relationship of mirror reflection with the groove slope of the grating surface. When laser light impinges on the diffraction grating in this way, the damage threshold of the grating will be considerably high. In the pulse compressor 20 having a double-path configuration as shown in FIG. 1, the laser pulse which returns to the first diffraction grating 201 after being reflected by the mirror 203 causes the highest amount of load on the grating since this laser pulse is temporally compressed and has a small spot size. To solve this problem, the diffraction grating 1 shown in FIG. 2 is used as the first diffraction grating 201 and positioned so that the light diffracted by the second diffraction grating 202 after being reflected by the mirror 203 will impinge on the diffraction grating 1 at substantially right angles to the groove slope. On the other hand, the second diffraction grating 202 is positioned so that the light reflected by the mirror 203 in the opposite direction to the travelling direction of the incident light coming from the mirror 19 will impinge on the grating 202 at substantially right angles to the groove slope. Therefore, in the present laser device, even if a laser pulse with a considerable amount of power is introduced into the pulse compressor 20, the diffraction gratings 201 and 202 in this pulse compressor 20 will not be damaged. Accordingly, a high-power laser pulse can be extracted.

Figure 6:
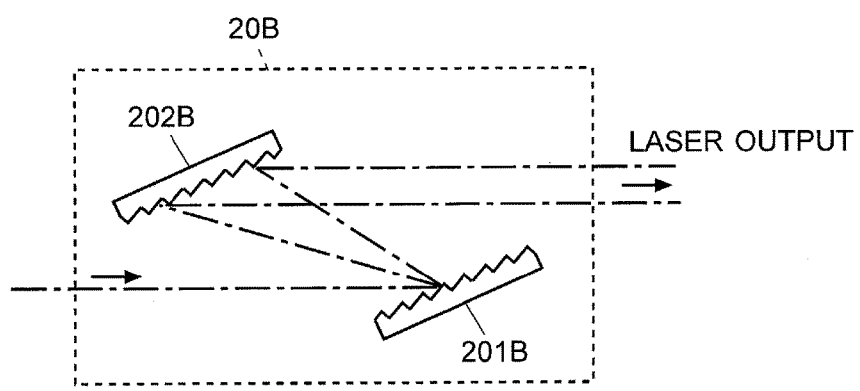
FIG. 6 is a schematic configuration diagram of a pulse compressor in a laser device according to another embodiment of the present invention.

Although the pulse compressor in the laser device shown in FIG. 1 has a double-path configuration, the diffraction grating according to the present invention can also be used in a pulse compressor having a single-path configuration. FIG. 6 is a schematic configuration diagram of a pulse compressor having a single-path configuration. Similarly to the pulsed compressor 20 shown in FIG. 1, the present pulsed compressor 20B includes a pair of diffraction gratings 201B and 202B arranged parallel to each other with their respective grating surfaces facing each other, but it has no reflection mirror. Since the angular dispersion by the first diffraction grating 201B is cancelled by the second diffraction grating 202B, a parallel beam impinging on the first diffraction grating 201B with different wavelength components restores its parallel form when it leaves the second diffraction grating 202B. The optical path lengths of those components of light having different wavelengths are previously adjusted so that the pulse which has been stretched in the forward and backward directions will be temporally compressed when it leaves the second diffraction grating 202B.

In this configuration, since the laser pulse travels a one-way path, the second diffraction grating 202B undergoes a higher amount of load than the first diffraction grating 201B. Accordingly, the diffraction grating 1 shown in FIG. 2 is used as the second diffraction grating 202B and positioned so that the light diffracted by the first diffraction grating 201B will impinge on the diffraction grating 1 at substantially right angles to the groove slope. Therefore, even if a laser pulse with a considerable amount of power is introduced into the pulse compressor 20B, the diffraction gratings 201 and 202 in this pulse compressor 20B will not be damaged. Accordingly, a high-power laser pulse can be extracted.

It should be noted that any of the previous embodiments is a mere example of the present invention and will evidently fall within the scope of claims of the present application even if any change, addition or modification is appropriately made within the spirit of the present invention. Specifically, the diffraction grating shown in the previous embodiments is an example for use with a laser wavelength of 1,064 nm. Needless to say, if the laser wavelength is different, the number of grooves, the blaze angle and other parameters should be appropriately designed for that wavelength. Such a designing technique itself is commonly known.

REFERENCE SIGNS LIST

1 . . . Diffraction Grating
10 . . . Laser Oscillator
11, 18 . . . Half Mirror
12 . . . Pulse Stretcher
122, 125 . . . Diffraction Grating
123 . . . Afocal Lens
126 . . . Mirror
13, 14, 15, 17, 19 . . . Mirror
16 . . . Laser Amplifier
20, 20B . . . Pulse Compressor
201, 202, 201B, 202B . . . Diffraction Grating
203 . . . Mirror
2 . . . Replica Substrate
3 . . . Resin Layer
4 . . . Au Layer

The invention claimed is:

1. A pulse compressor for a laser device using a chirped pulse amplification method, comprising
two identically shaped diffraction gratings provided as first and second diffraction gratings arranged parallel to each other with their respective grating surfaces facing each other, and
a mirror for receiving a laser pulse via the first and second diffraction gratings and for reflecting the laser pulse so that the laser pulse sequentially impinges on the second and first diffraction gratings,
wherein:
the two diffraction grating are a reflective blazed diffraction grating having grooves with a sawtooth-shaped section covered with a reflective metallic coating at least on their surface, and each of the two diffraction grating has a blaze angle determined so that, at a wavelength of a laser pulse to be used, an incident angle of an incoming laser pulse and first order diffracted light form a relationship of mirror reflection with a groove slope, and a predetermined level of diffraction efficiency is obtained, and
the two diffraction gratings are arranged so that the laser pulse travelling from the second diffraction grating to the first diffraction grating impinges on the first diffraction grating at an angle that is as close as possible to a right angle to the groove slope of the first diffraction grating, where the angle that is as close as possible to a right angle is an angle at which the light pulse impinges on the first diffraction grating so that the light pulse reflected by the first diffraction grating is not interrupted by the second diffraction grating.

2. The pulse compressor according to claim 1, wherein:
the diffraction grating is a replicated diffraction grating having a grating surface created by forming a metallic reflection coating on the grating grooves of a master diffraction grating having grooves with a predetermined sawtooth-shaped section, making the metallic reflection coating in tight contact with a replica substrate via a resin material in between, and releasing the replica substrate from the master diffraction grating, with the metallic reflection coating in an inverted form adhered to the replica substrate.

3. A laser device using a chirped pulse amplification method comprising the pulse compressor according to claim 2.

4. A laser device using a chirped pulse amplification method, the laser device comprising the pulse compressor according to claim 1.

5. A pulse compressor for a laser device using a chirped pulse amplification method, comprising:
two identically shaped diffraction gratings provided as first and second diffraction gratings arranged parallel to each other with their respective grating surfaces facing each other, and a laser pulse being extracted via the two diffraction gratings,
wherein
the two diffraction gratings are a reflective blazed diffraction grating having grooves with a sawtooth-shaped section covered with a reflective metallic coating at least on their surface, and each of the two diffraction grating has a blaze angle determined so that, at a wavelength of a laser pulse to be used, an incident angle of an incoming laser pulse and first order diffracted light form a relationship of mirror reflection with a groove slope, and a predetermined level of diffraction efficiency is obtained, and
the two diffraction gratings are arranged so that the laser pulse travelling from the first diffraction grating to the second diffraction grating impinges on the second diffraction grating at an angle that is as close as possible to a right angle to the groove slope of the second diffraction grating, where the angle that is as close as possible to a right angle is an angle at which the light pulse impinges on the first diffraction grating so that the light pulse reflected by the first diffraction grating is not interrupted by the second diffraction grating.

6. The pulse compressor according to claim 5, wherein:
the diffraction grating is a replicated diffraction grating having a grating surface created by forming a metallic reflection coating on the grating grooves of a master diffraction grating having grooves with a predetermined sawtooth-shaped section, making the metallic reflection coating in tight contact with a replica substrate via a resin material in between, and releasing the replica substrate from the master diffraction grating, with the metallic reflection coating in an inverted form adhered to the replica substrate.

7. The pulse compressor according to claim 6, wherein:
the metallic reflection coating is a thin gold film.

8. A laser device using a chirped pulse amplification method comprising the pulse compressor according to claim 6.

9. A laser device using a chirped pulse amplification method comprising the pulse compressor according to claim 5.

* * * * *